(12) United States Patent
Herrada et al.

(10) Patent No.: US 12,088,145 B2
(45) Date of Patent: Sep. 10, 2024

(54) ELECTRIC MOTOR, STATOR FOR ELECTRIC MOTOR AND METHOD OF MANUFACTURING THE SAME

(71) Applicant: Valeo Systemes d'Essuyage, La Verriere (FR)

(72) Inventors: Jose Luis Herrada, La Verriere (FR); Mehdi Belhaj, La Verriere (FR)

(73) Assignee: Valeo Systemes d'Essuyage, LaVerriere (FR)

( * ) Notice: Subject to any disclaimer, the term of this patent is extended or adjusted under 35 U.S.C. 154(b) by 243 days.

(21) Appl. No.: 17/870,627

(22) Filed: Jul. 21, 2022

(65) Prior Publication Data

US 2023/0025242 A1    Jan. 26, 2023

(30) Foreign Application Priority Data

Jul. 26, 2021   (FR) ...................................... 2108055

(51) Int. Cl.
*H02K 3/38*    (2006.01)
*H02K 1/16*    (2006.01)
*H02K 3/12*    (2006.01)
*H02K 3/48*    (2006.01)
*H02K 15/085*  (2006.01)

(52) U.S. Cl.
CPC ............... *H02K 1/165* (2013.01); *H02K 3/12* (2013.01); *H02K 3/48* (2013.01); *H02K 15/085* (2013.01)

(58) Field of Classification Search
CPC .. H02K 3/38; H02K 15/0068; H02K 15/0081; H02K 2203/09
See application file for complete search history.

(56) References Cited

U.S. PATENT DOCUMENTS

2019/0036391 A1    1/2019   Brohm et al.

FOREIGN PATENT DOCUMENTS

| DE | 102016205538 A1 | 10/2017 |
| EP | 2947319 A1 | 11/2015 |
| WO | 2011108736 A1 | 9/2011 |

OTHER PUBLICATIONS

French Repuplic of Industrial Property, Preliminary Search Report of corresponding Patent Application No. FR2108055, dated Apr. 6, 2022.

*Primary Examiner* — Ramon M Barrera
(74) *Attorney, Agent, or Firm* — Valeo Systemes d'Essuyage (57) ABSTRACT

The present invention relates to a stator for an electric motor, comprising a plurality of separate teeth comprising a first connector and a second connector, a plurality of coils which are configured to be wound respectively around the plurality of separate teeth, a first end of the wire of the winding being configured to be positioned in the first connector and a second end of the wire of the winding being configured to be positioned in the second connector, a central module configured to receive the separate teeth, said central module comprising connecting frames comprising connecting tabs extending radially and configured to be inserted in a first connector or in a second connector of a separate tooth, the connecting frames being configured to provide electrical connections between the coils.

10 Claims, 8 Drawing Sheets

ELECTRIC MOTOR, STATOR FOR ELECTRIC MOTOR AND METHOD OF MANUFACTURING THE SAME

CROSS-REFERENCE TO RELATED APPLICATIONS

This application claims priority benefit to French Application No. 2108055 filed on Jul. 26, 2021, the disclosure of which is herein incorporated by reference in its entirety.

TECHNICAL FIELD

The present invention relates to the field of electric motors particularly electric motors intended to be fitted to electric bicycles.

BACKGROUND OF THE INVENTION

Electric bicycles are becoming increasingly popular because of the ease of travel they afford, while having lower energy consumption, low environmental impact, and low cost price.

However, the use of an electric motor in an electric bicycle involves a number of constraints. In particular, it is necessary to provide a high torque and a low rotational speed so as to provide effective assistance while at the same time being compatible with the rate at which the cyclist pedals.

Furthermore, the siting of the electric motor on the bicycle, generally in the region of the bottom bracket assembly of the bicycle, runs into constraints on size so as to allow the electric motor to be installed without compromising on other features of the bicycle. In addition, the noise produced by the electric motor also needs to be limited.

BRIEF SUMMARY OF THE INVENTION

In order to at least partially address these constraints, the present invention therefore seeks to provide an electric motor of reduced bulk which is able to produce a relatively high torque.

One subject matter of the invention is therefore a stator for an electric motor comprising:
  a plurality of separate teeth comprising a first connector and a second connector,
  a plurality of coils which are configured to be wound respectively around the plurality of separate teeth, a first end of the wire of the winding being configured to be positioned in the first connector and a second end of the wire of the winding being configured to be positioned in the second connector,
  a central module configured to receive the separate teeth, said central module comprising connecting frames comprising connecting tabs extending radially and configured to be inserted in a first connector or in a second connector of a separate tooth, the connecting frames being configured to provide electrical connections between the coils.

The use of a central module comprising connecting frames configured to connect the coils of the stator and of separate teeth configured to be fixed to the central module makes it possible to obtain a stator that is quick and easy to assemble, allowing large-scale mass production.

According to another aspect of the present invention, the connecting frames comprise a central ring from which the connecting tabs associated with said connecting frame extend.

According to another aspect of the present invention, the central rings of the connecting frames are superposed in an axial direction and are separated from one another by electrically non-conducting intermediate walls of the central module.

According to another aspect of the present invention, the intermediate walls are made of plastic.

According to another aspect of the present invention, the stator also comprises a field frame configured to be positioned around the separate teeth when the separate teeth are positioned on the central module.

According to another aspect of the present invention, the coils are connected in a star or Delta configuration.

According to another aspect of the present invention, the connecting frames are configured to connect the coils in a full pitch winding configuration wherein the coils of a phase are connected in parallel with respect to one another.

According to another aspect of the present invention, the connecting frames are configured to connect the coils in a fractional pitch winding configuration wherein at least some of the coils of a phase are connected in series.

According to another aspect of the present invention, the central module also comprises additional connectors configured to allow the coils to be powered via an external power supply.

The present invention also relates to an electric motor comprising a rotor and a stator as described hereinabove.

According to another aspect of the present invention, the electric motor is a three-phase brushless motor and the rotor comprises 10 or 14 poles. A different number of poles is also possible.

The present invention also relates to a method of manufacturing a stator as described hereinabove, wherein the method comprises the following steps:
  a step of winding the coils around the separate teeth,
  a step of positioning the ends of the winding wire of the coils in first and second connectors of the separate teeth,
  a step of connecting the separate teeth to the central module so that the connecting tabs of the connecting frames become inserted in the first and second connectors to make the connection between the coils and the connecting frames,
  a step of positioning a field frame around the separate teeth.

According to another aspect of the present invention, the winding step involves winding a winding wire onto a bobbin to form a coil, the assembly comprising the bobbin and the winding wire forming a separate tooth configured to be positioned on the stator body.

According to another aspect of the present invention, the step of connecting the separate teeth to the central module involves clip-fastening the first and second connectors to the connecting tabs.

BRIEF DESCRIPTION OF THE DRAWINGS

Further features and advantages of the invention will emerge more clearly on reading the following description, provided by way of illustrative and non-limiting example, and the appended drawings, in which.

In these figures, elements that are identical bear the same reference signs.

DETAILED DESCRIPTION OF THE INVENTION

The following embodiments are examples. Although the description refers to one or more embodiments, this does not necessarily mean that each reference relates to the same embodiment, or that the features apply only to a single embodiment. Individual features of various embodiments may also be combined or interchanged in order to create other embodiments.

In the present description, some elements or parameters may be indexed, such as, for example, first element or second element and first parameter and second parameter or else first criterion and second criterion, etc. In this case, this is simple indexing for differentiating and denoting elements or parameters or criteria that are similar but not identical. This indexing does not imply a priority of one element, parameter or criterion over another and such denominations may be easily interchanged without departing from the scope of the present description. This indexing also does not imply an order in time, for example, for assessing such or such a criterion.

Figure 1:
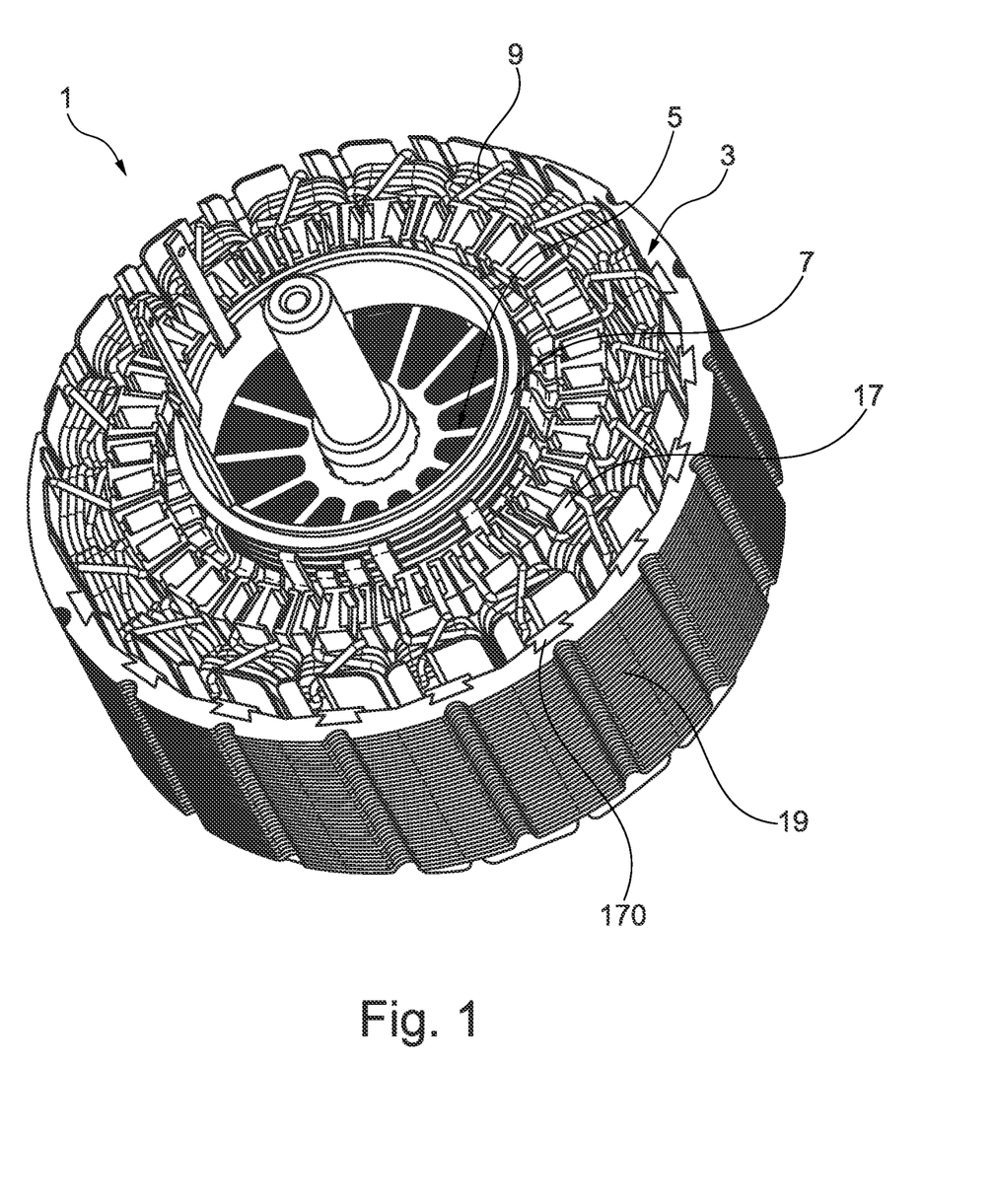
FIG. 1 is a schematic perspective view of part of an electric motor according to a first embodiment.

FIG. 1 is a diagram of part of an electric motor 1 comprising a stator 3 and a rotor 5. The electric motor 1 is for example a brushless electric motor, although the present invention is not restricted to that type of electric motor. Such an electric motor 1 is particularly suitable for being fitted to an electric bicycle, but the present invention is not restricted to that application.

Figure 2:
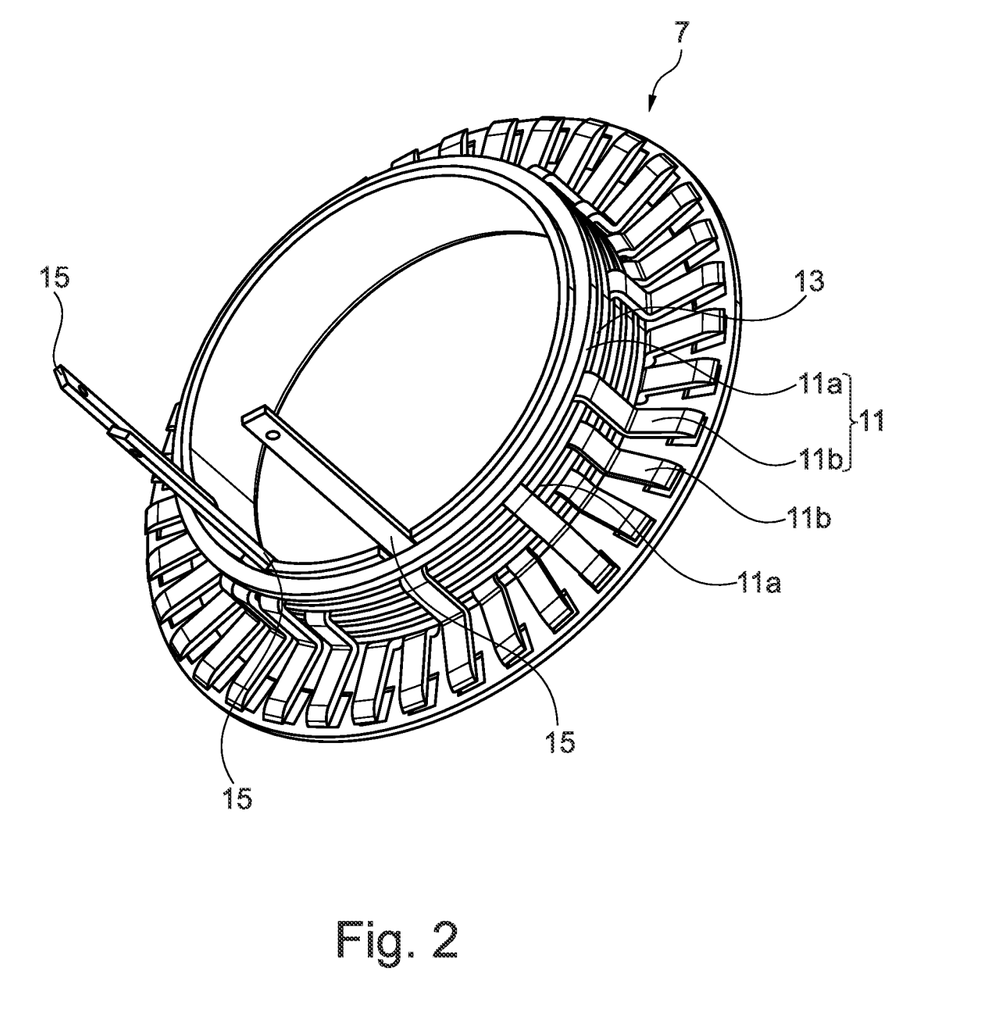
FIG. 2 is a schematic perspective view of a central module of the stator comprising connecting frames intended to connect coils of the stator.

The stator 3 comprises a central module 7 depicted in FIG. 2. The central module 7 comprises connecting frames 11 configured to connect coils 9 that are intended to be positioned around the central module 7. The central module 7 comprises for example four connecting frames 11 which are configured to connect the coils 9 to one another.

Figure 3:
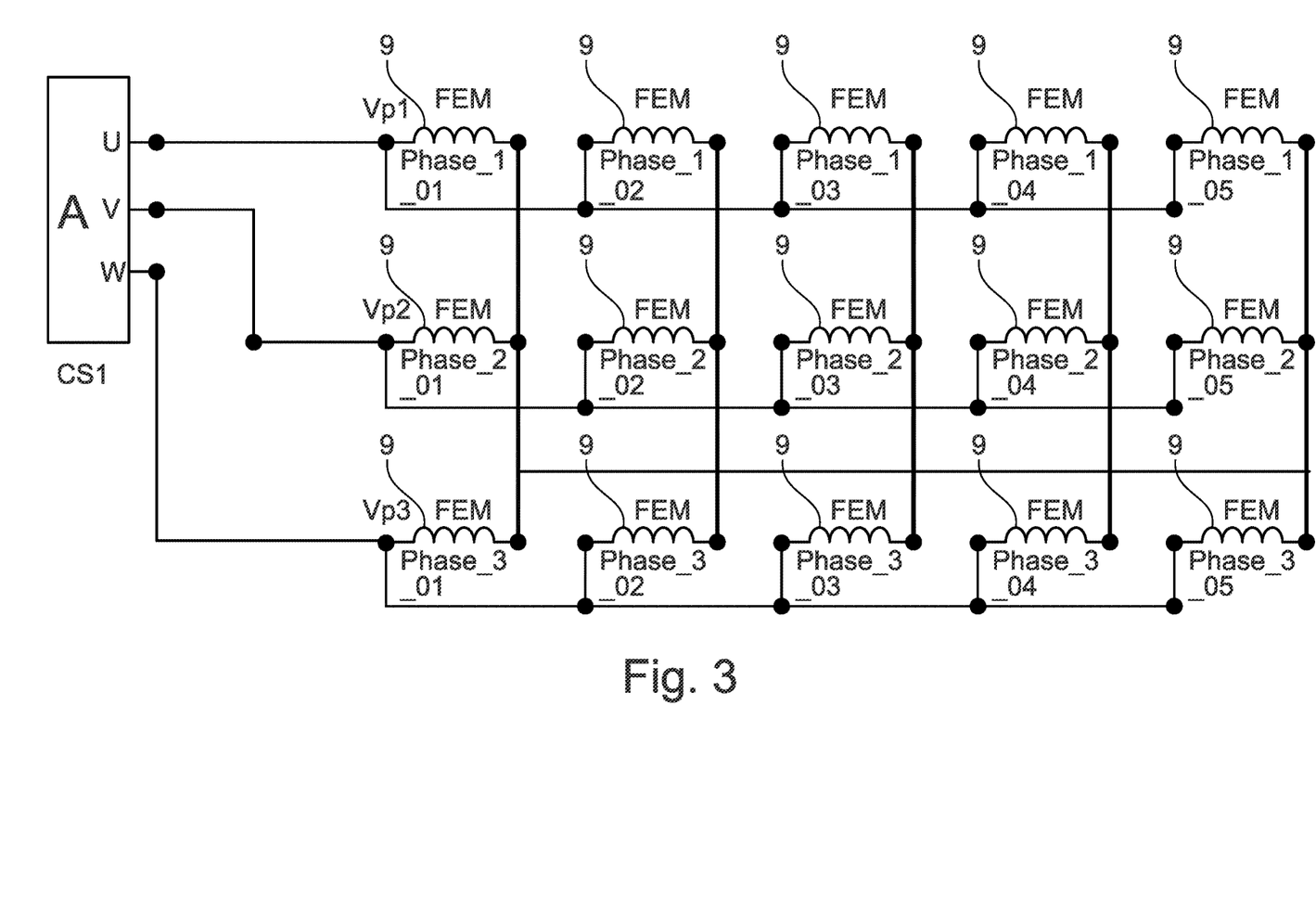
FIG. 3 is an electrical diagram of a standard star winding for a three-phase electric motor comprising 15 coils.

FIG. 3 depicts a first electrical configuration in which the stator 3 comprises 15 three-phase coils 9, the phases being denoted u, v and w, and in which the coils 9 are star-connected in the standard full-pitch winding configuration, which is to say a winding in which the various coils 9 of a phase u, v, w are arranged in parallel. Such a stator 3 can be used in a 10-pole electric motor 1.

Figure 4:
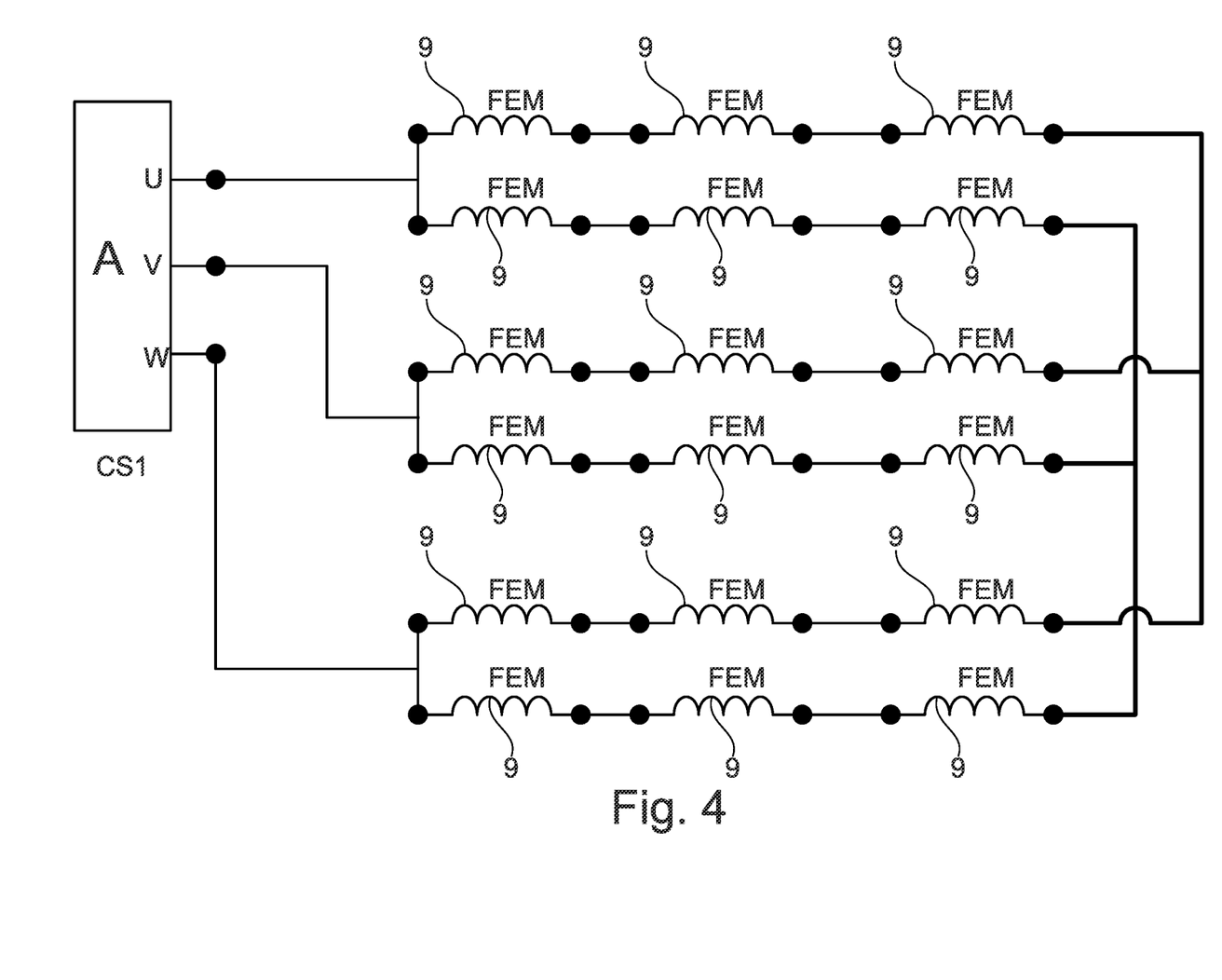
FIG. 4 is an electrical diagram of a fractional star winding for a three-phase electric motor comprising 18 coils.

FIG. 4 depicts a second electrical configuration in which the stator 3 comprises 18 three-phase coils 9, the phases being denoted u, v and w, and in which the coils 9 are star-connected in a fractional-pitch winding configuration, which is to say a winding in which certain coils 9 of a phase u, v, w are arranged in series. In this particular instance, each phase u, v, w comprises two branches of three coils 9 arranged in series, the two branches being arranged in parallel. A fractional-pitch winding makes it possible to have a gentler transition as the poles of the rotor 5 move past the teeth of the stator 3 and thus makes it possible to reduce the noise generated by the electric motor 1. Such a stator 3 can be used in a 14-pole electric motor.

Such configurations make it possible to obtain a high torque while at the same time limiting the size of the electric motor 1.

The invention is not restricted to the two winding configurations shown in FIGS. 3 and 4, which means that other configurations having a different number of coils 9 or of coils 9 in parallel per phase u, v, w may also be used. A Delta-connected stator 3 winding and a rotor 5 having a different number of poles may also be used.

Thus, the connecting frames 11 make it possible to obtain the desired connections between the coils 9. The connecting frames 11 comprises for example a central ring 11a from which connecting tabs 11b associated with said connecting frame 11 extend. The central rings 11a are for example axially superposed and separated from one another by electrically non-conducting intermediate walls 13 so as to avoid any short-circuiting between the connecting frames 11. The connecting frames 11 are for example made of metal, notably of aluminium, brass, copper or iron, and the intermediate walls 13 are for example made of plastic.

The connecting tabs 11b extend radially from the central rings 11a and may comprise a proximal first end in the shape of a straightened-out letter S or Z, which is to say having a connecting bar extending vertically, so as to compensate for the difference in axial height between the various central rings 11a and a distal second end configured to be connected to one end of a coil 9. The connecting tabs 11b of the various connecting frames 11 may be uniformly distributed around the central rings 11a. Adjacent connecting tabs 11b are distant from one another in order to avoid any short-circuiting between the various connecting frames 11.

The central module 7 may also comprise additional connectors 15, for example three additional connectors 15 which extend axially and which are configured to allow the various phases u, v, w to be powered via a power supply external to the stator 3.

The central module 7 is configured to receive separate teeth 17 formed by bobbins around which winding wires are wound to form the coils 9. A field frame 19 (visible in FIG. 1) of cylindrical shape is also configured to be positioned around the separate teeth 17. The field frame 19 comprises for example axial channels or slots 190 configured to receive an endpiece 170 of the separate teeth 17 to allow the separate teeth 17 and the field frame 19 to be fixed together.

Figure 5:
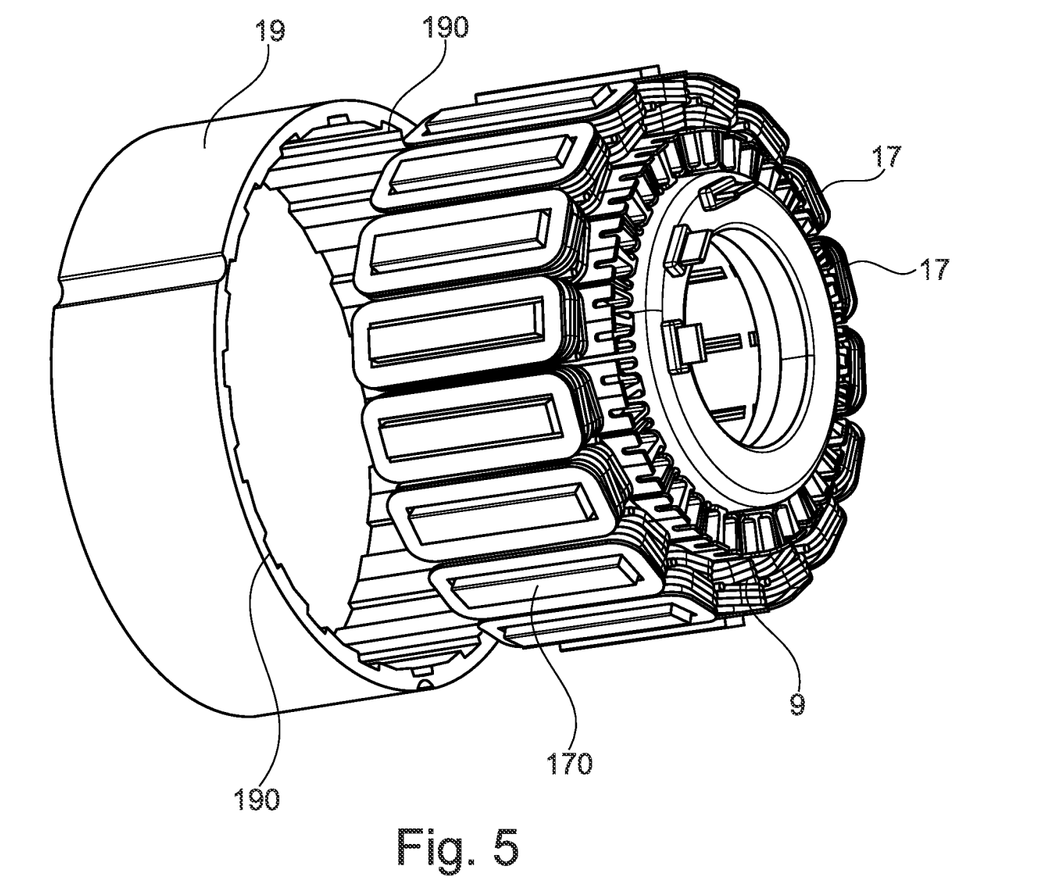
FIG. 5 is a perspective view of a stator with separate teeth.

The separate teeth 17 are removable in relation to the field frame 19. FIG. 5 depicts an example of a stator 3 with separate teeth 17 in which state of the field frame 19 comprises a plurality of slots 190 extending axially on the internal side of the field frame 19. In the case of FIG. 5, the stator 3 comprises eighteen separate teeth 17 but a stator 3 comprising a different number of separate teeth 17, notably fifteen teeth as in FIG. 1, may of course also be produced. The slots 190 have for example a dovetail or T-shaped cross section. The teeth 17 therefore comprise a fixing endpiece 170 of a cross-sectional shape that complements that of the slots 190. The fixing endpiece 170 is intended to be introduced into a slot 190 of the cylindrical part 19 through a translational movement of the fixing endpiece 170 in the slot 190. The teeth 17 are fixed in place as a result of the complementing shapes of the fixing endpiece 170 and of the slot 190. The use of a stator 3 with separate teeth 17 allows the coils 9 to be wound onto the bobbins that form the teeth 17 prior to the positioning of the teeth 35 on the field frame 19, thereby making it possible to reduce the space needed between the coils 9 so that the coils 9 can thus be more closely spaced relative to one another. That also allows the positioning of the teeth on the central module 7.

Figure 6:
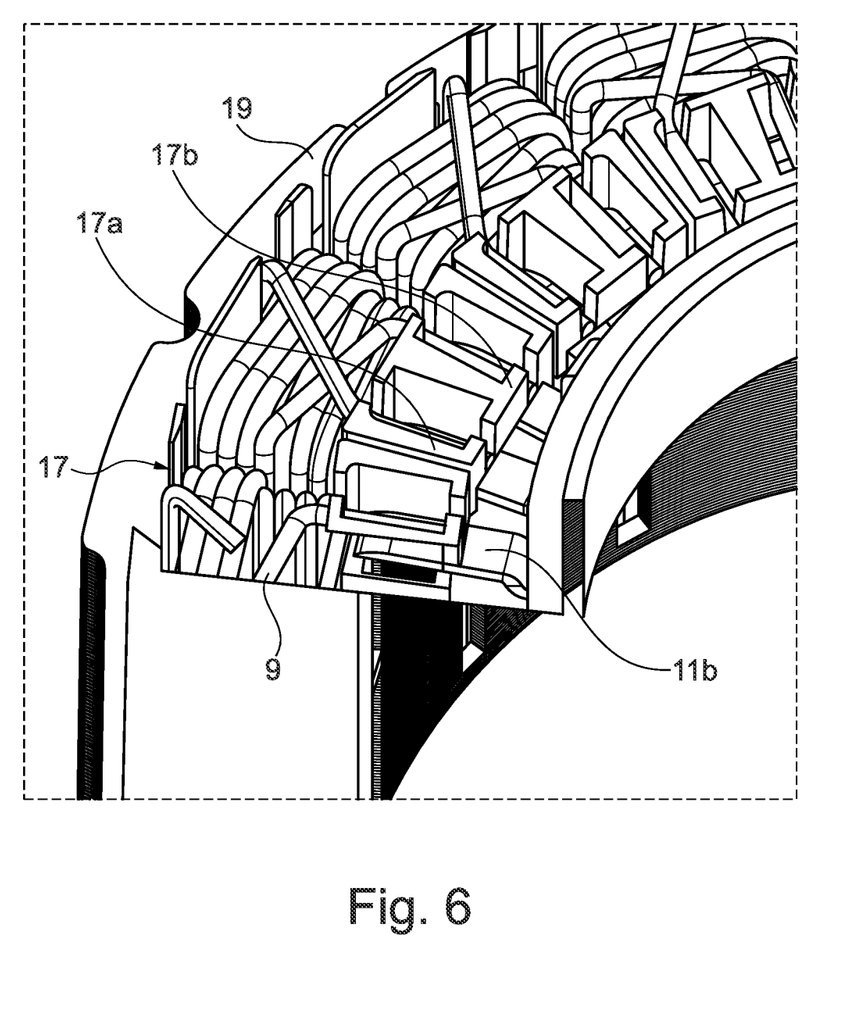
FIG. 6 is an enlarged view of part of the stator of FIG. 1.

In addition, the separate teeth 17 of the stator 3 comprise a first connector 17a and a second connector 17b (visible in FIG. 6). The first connector 17a is configured to be connected to a first end of the winding wire of a coil 9, and the second connector 17b is configured to be connected to a second end of the winding wire of a coil 9. The ends of the winding wire may be fixed in the first 17a and second 17b connectors by contact (the connector 17a, 17b for example comprising a housing configured to receive the winding wire as in the case of self-stripping connectors. Alternatively, it is the connecting tab 11b that may comprise an endpiece of the self-stripping type configured to accept the end of the winding wire), by brazing or by soldering. In addition, the first 17a and second 17b connectors are configured to each accept the distal end of a connecting tab 11b upon insertion of the separate teeth onto the central module 7 and thus allow the tooth to be fixed to the central module 7. The connection may be made for example by clip-fastening the separate tooth 17 on to the central module 7 via the connecting tabs 11b and the connectors 17a, 17b. The first 17a and second 17b connectors comprise for example two U-shapes facing one another and forming a slot configured to accept the end of the coil 9. The distal end of the connecting tab 11b is configured to come into contact with the end of the winding wire held in the connector 17a, 17b and thus achieve contact between the end of the coil 9 and the connecting tab 11b received by the connector 17a, 17b. In the case of FIGS. 1 and 6, the slots in the connectors 17a and 17b are oriented radially and the connecting tabs 11b extend rectilinearly to come into contact with the end of the coils 9 positioned in the slots. The connecting tabs 11b thus form a male portion configured to be introduced into a complementary female portion formed by the connectors 17a and 17b to ensure mechanical and electrical connection between the connecting tabs 11b and the connectors 17a, 17b comprising the end of the winding wire. Alternatively, the female portion of the mechanical connection can be borne by the connecting tabs 11b and the male portion by the connectors 17a and 17b.

Figure 7:
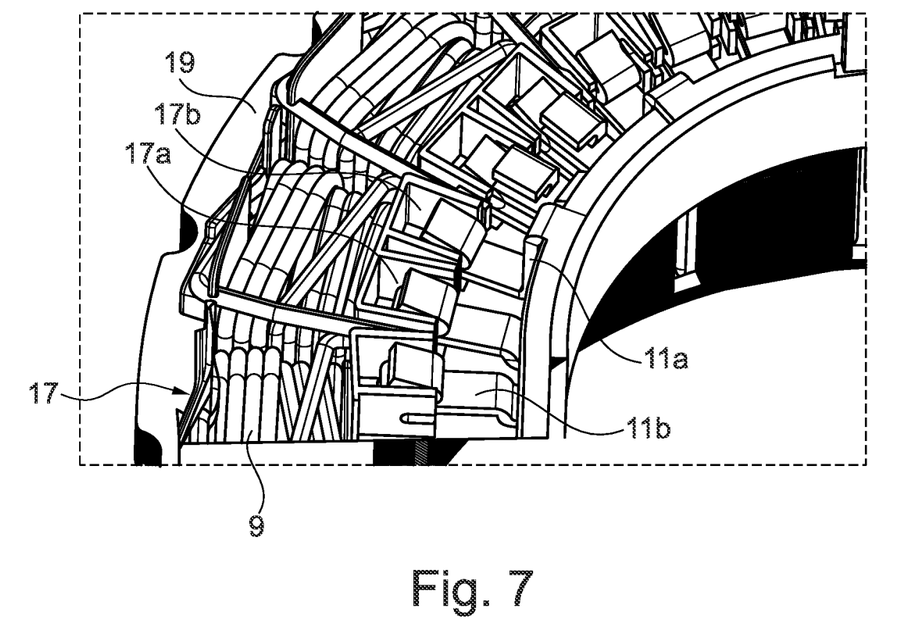
FIG. 7 is a schematic perspective view of part of a stator according to an embodiment variant.

FIG. 7 depicts an embodiment variant in which the connectors 17a and 17b have a U-shape of which the branches each comprise a slot, the end of the coil 9 extending between the two slots in a tangential direction. The connecting tabs 11b have a distal end in the shape of a C or of an S, the hollow of the S or of the C of the connecting tab coming into contact with the end of the coil 9 that extends between the two slots of the connector 17a, 17b.

Any other configuration of the connecting tabs and of the connectors 17a and 17b which ensures contact between the ends of the winding wire and the connecting frames may equally well be used.

As depicted in FIG. 1, the stator 3 comprises a plurality of separate teeth 17 although a different number of separate teeth 17 may be used. The separate teeth 17 may have an H-shaped radial section forming a bobbin configured to retain the windings that form the coils 9. Thus, a coil 9 is formed on each separate tooth 17 by winding turns of a winding.

The winding that forms the coils 33 generally comprises a plurality of turns that are adjacent and extend between the radial ends of the separate tooth 17. In addition, a plurality of layers of turns may be superposed around the separate tooth 17.

The present invention also relates to an electric motor 1 comprising a stator 3 as previously described. The electric motor 1 also comprises a rotor 5 (visible in FIG. 1) configured to be positioned inside the stator 3, which is to say facing and at the center of the central module 7 so that the rotor is positioned on the inside of the separate teeth 17 comprising the coils 33. The electric motor 1 is for example a brushless three-phase DC motor and for example has 10 or 14 poles (in the case of an electric motor 1 with 15 or 18 coils 9) although other types of electric motor 1 notably having a different number of poles may also be used. The poles are for example produced using permanent magnets arranged on the rotor 5.

The present invention also relates to a method for manufacturing a stator 3 as described hereinabove.

Figure 8:
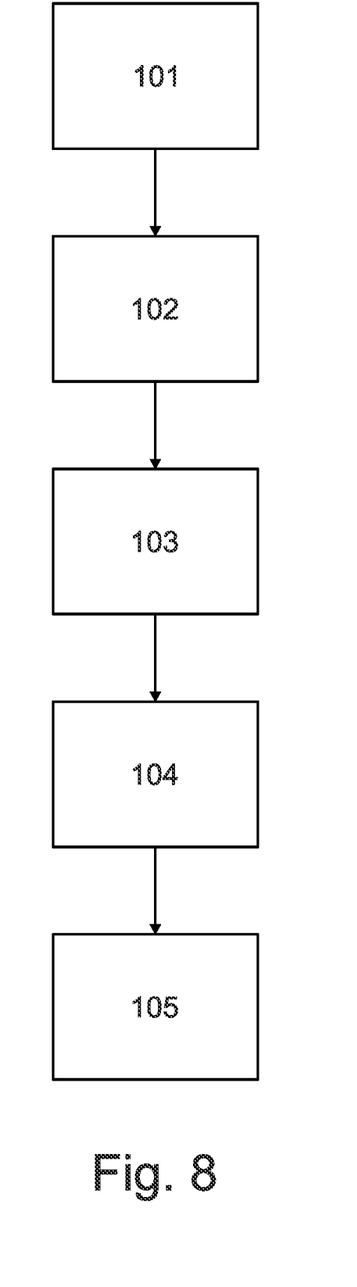
FIG. 8 is a flow diagram of the steps of a method for manufacturing a stator.

FIG. 8 is a flow diagram of the steps of the method for manufacturing such a stator 3.

The first step 101 is to wind the wire for winding the coils 9 around the separate teeth 17. The separate teeth 17 have, for example, an H-shaped section and form a bobbin configured to retain the turns that form the coils 9. The coils 9 comprise a plurality of turns which extend between the branches of the H. A coil 9 may comprise several superposed layers of turns. The winding is performed for example by a robot and the coils 9 may all be identical.

The second step 102 involves the positioning of a first end of the winding wire of the coils 9 in a first connector 17a of the separate tooth 17 and a second end of the winding wire of the coils 9 in a second connector 17b of the separate tooth 17. The connectors 17a, 17b comprise for example a slot into which the end of the winding wire is positioned. The ends of the winding wires may be held in the connectors 17a, 17b by mechanical retention (as in a self-stripping connector), by brazing or by welding.

The third step 103 involves the positioning of a central module 7 comprising the connecting frames at the center of a stator body.

The fourth step 104 involves inserting the separate teeth 17 on the central module 7 so that the connecting tabs 11b of the connecting frames 11 become inserted in the first 17a and second 17b connectors to make the connection between the coils 9 and the connecting frames 11. A connecting tab 11b is configured to come into contact with an end of the winding wire of a coil 9 at a first connector 17a or a second connector 17b. Fixing is achieved for example by clip-fastening the separate teeth 17 onto the central module 7.

The fifth step 105 involves positioning a field frame 19 around the separate teeth 17. The field frame 19 is positioned over the separate teeth 17 by axial translation so that the slots 190 in the field frame accept the fixing endpieces 170 of the separate teeth.

Thus, the use of a central module 7 comprising the connecting frames 11, and of separate teeth 17 configured to become positioned on the central module 7 and make the connection between the coils 9 and the connecting frames 11, makes it possible to obtain a stator 3 that is quick and simple to assemble. In addition, the creation of connecting frames that are superposed in an axial direction, and the use of separate teeth, make it possible to limit the radial size of the stator 3.

What is claimed is:
1. Stator for an electric motor comprising:
  a plurality of separate teeth comprising a first connector and a second connector,
  a plurality of coils which are configured to be wound respectively around the plurality of separate teeth, a first end of a wire of a coil being configured to be positioned in the first connector and a second end of the wire of the coil being configured to be positioned in the second connector, a central module configured to receive the separate teeth, said central module comprising connecting frames comprising connecting tabs extending radially and configured to be inserted in a first connector or in a second connector of a separate tooth, the connecting frames being configured to provide electrical connections between the coils.

2. Stator according to claim 1, wherein the connecting frames comprise a central ring from which the connecting tabs associated with said connecting frame extend.

3. Stator according to claim 1, wherein central rings of the connecting frames are superposed in an axial direction and are separated from one another by electrically non-conducting intermediate walls of the central module.

4. Stator according to claim 1 also comprising a field frame configured to be positioned around the separate teeth when the separate teeth are positioned on the central module.

5. Stator according to claim 1, wherein the connecting frames are configured to connect the coils in a full pitch winding configuration wherein the coils of a phase (u, v, w) are connected in parallel with respect to one another.

6. Stator according to claim 1, wherein the connecting frames are configured to connect the coils in a fractional pitch winding configuration wherein at least some of the coils of a phase (u, v, w) are connected in series.

7. Electric motor comprising a rotor and a stator according to claim 1.

8. Method for manufacturing a stator according to claim 1, wherein the method comprises the following steps:
- a step of winding the coils around the separate teeth,
- a step of positioning the ends of the winding wire of the coils in first and second connectors of the separate teeth,
- a step of connecting the separate teeth to the central module so that the connecting tabs of the connecting frames become inserted in the first and second connectors to make the connection between the coils and the connecting frames,
- a step of positioning a field frame around the separate teeth.

9. Method of manufacture according to claim 8, wherein the winding step involves winding a winding wire onto a bobbin to form a coil, the assembly comprising the bobbin and the winding wire forming a separate tooth configured to be positioned on the stator body.

10. Method of manufacture according to claim 8, wherein the step of connecting the separate teeth to the central module involves clip-fastening the first and second connectors to the connecting tabs.

* * * * *